United States Patent
Hashimoto

(10) Patent No.: US 7,391,693 B2
(45) Date of Patent: Jun. 24, 2008

(54) INFORMATION PROVISION APPARATUS

(75) Inventor: Koji Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 630 days.

(21) Appl. No.: 10/952,896

(22) Filed: Sep. 30, 2004

(65) Prior Publication Data

US 2005/0078581 A1 Apr. 14, 2005

(30) Foreign Application Priority Data

Oct. 9, 2003 (JP) .......................... P.2003-351139

(51) Int. Cl.
*G11B 27/36* (2006.01)
*G01C 21/00* (2006.01)

(52) U.S. Cl. .................... 369/53.31; 369/53.2; 701/200

(58) Field of Classification Search .............. 369/47.11, 369/47.44, 53.18, 53.37, 53.31, 53.2; 701/200
See application file for complete search history.

(56) References Cited

U.S. PATENT DOCUMENTS 5,392,269 A * 2/1995 Horie .......................... 369/53.2

2004/0027940 A1 * 2/2004 Minamino et al. .......... 369/47.3
2004/0204851 A1 * 10/2004 Fukuyasu .................... 701/213

FOREIGN PATENT DOCUMENTS

| JP | 6-302092 A | 10/1994 |
| JP | 07 210653 A | 8/1995 |
| JP | 2002-333324 A | 11/2002 |
| JP | 2003-216504 A | 7/2003 |

OTHER PUBLICATIONS

Office Action of the German Patent and Trademark Office.

* cited by examiner

*Primary Examiner*—Thang V. Tran
(74) *Attorney, Agent, or Firm*—Sughrue Mion, PLLC

(57) ABSTRACT

An information provision apparatus has a detachable information storage medium that stores information, an information storing portion that storing information read from the information storage medium, a processing portion that performs a reproduction processing of information stored in the information storing portion, an output portion that outputs information reproduced by the processing portion, and a clocking portion that counts an elapsed time since the information storage medium is detached from the information provision apparatus, wherein the processing portion stops the reproduction processing when the elapsed time exceeds a specified value.

12 Claims, 5 Drawing Sheets

INFORMATION PROVISION APPARATUS

BACKGROUND OF THE INVENTION

1. Field of the Invention

This invention belongs to a field of an information provision apparatus for providing various information, and particularly relates to a method for inhibiting unauthorized use of information in the information provision apparatus for providing information using information stored in a detachable information storage medium.

2. Description of the Related Art

In recent years, an information provision apparatus with a DVD (Digital Versatile Disk) which is a detachable mass information storage medium and a hard disk drive (HDD) which is likewise mass information storing portion has actively been developed. For example, in a vehicle-mounted navigation apparatus, a home-use video recorder, a personal computer, etc., various apparatus with such a configuration have been developed.

In such an information provision apparatus, information previously stored in a commercially available DVD is protected by copyright in most cases, and a user who has bought the DVD duly (that is, has paid the information fees and copyright fees) is permitted to use the information stored in the DVD within the use restrictions.

However, there was a problem that the DVD is delivered from a duly authorized user to another user and thereby another user who has not bought the DVD duly (that is, has not paid the information fees and copyright fees) copies information stored in the DVD into an HDD illegally and a situation of unauthorized use is caused.

In such a background, various techniques are disclosed with respect to a method for inhibiting unauthorized use of information in the information provision apparatus for providing information using information stored in a detachable information storage medium.

For example, a navigation apparatus constructed so that illegally copied data cannot be used is disclosed (see JP-A-2003-216504). That is, the navigation apparatus has a first data recording part for setting a first recording medium, a second data recording part for setting a second recording medium, data decision processing portion for deciding whether or not data is present in the first recording medium, and data selection processing portion for selecting one of data of the first and second recording media when the data is present in the first recording medium and stopping selection of the data when the data is absent in the first recording medium, so that the illegally copied data cannot be used since selection of the data is stopped when the data is absent in the first recording medium.

Also, an illegal copy inhibition method constructed so that when a disk-shaped recording medium is loaded into an information processing apparatus, the type is identified and thereby when the disk-shaped recording medium loaded is a rewritable type, it is regarded as an error and processing is stopped to prevent an illegal copy is disclosed (see JP-A-6-302092). That is, the number of dent holes for identification is two in the case of a cartridge for rewritable type disk, so that a switch outputs two pulses. A counter counts the pulses outputted from the switch and outputs a count value 2. A disk type identification part decides that the loaded disk is a rewritable type disk from the output value of the counter. When a playback-only type disk cartridge is loaded, the switch only outputs one pulse and an output value of the counter becomes one, and the disk type identification part decides that the loaded disk is a playback-only type disk from the output value of the counter.

JP-A-2003-216504 and JP-A-6-302092 are referred to as related art.

However, in the conventional method as described in JP-A-2003-216504, there was a problem that a storage medium such as a DVD bought duly must always be attached to an apparatus and for a navigation apparatus etc., a DVD for map information cannot be replaced with a DVD for another information such as a movie.

Also, in the conventional method as described in JP-A-6-302092, there was a problem that it is difficult to identify a type of a storage medium such as a DVD which is not loaded in a cartridge.

SUMMARY OF THE INVENTION

The object of the invention is to provide an information provision apparatus capable of easily inhibiting unauthorized use of information stored in a detachable information storage medium.

The invention provides an information provision apparatus having: a detachable information storage medium that stores information; an information storing portion that stores information read from the information storage medium; a processing portion that performs a reproduction processing of information stored in the information storing portion; an output portion that outputs information reproduced by the processing portion; and a clocking portion that counts an elapsed time since the information storage medium is detached from the information provision apparatus, wherein the processing portion stops the reproduction processing when the elapsed time exceeds a specified value.

Therefore, it is possible to easily inhibit unauthorized use of information stored in a detachable information storage medium.

DETAILED DESCRIPTION OF THE PREFERRED EMBODIMENTS

An embodiment according to the invention will be described below.

First Embodiment

An example of the case of being applied to a navigation apparatus mounted in a vehicle acting as a mobile unit will be described as a first embodiment of an information provision apparatus according to the invention.

Figure 1:
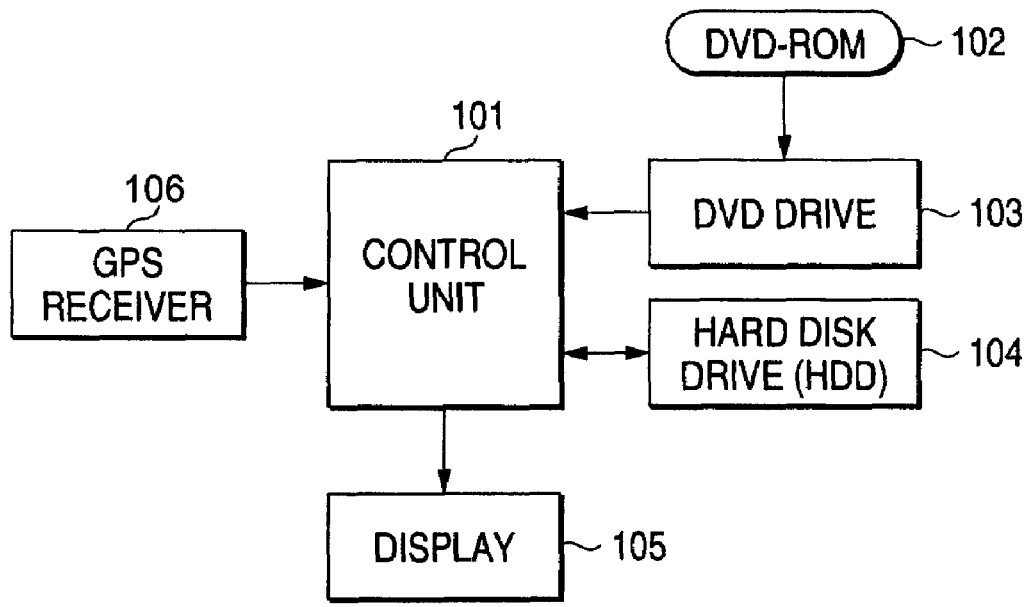
FIG. 1 is a diagram of the whole configuration of a navigation apparatus in a first embodiment of the invention.

FIG. 1 shows a diagram of the whole configuration of a navigation apparatus in the first embodiment of the invention. In FIG. 1, numeral 101 is a control unit acting as processing portion for controlling an operation of the whole apparatus, and numeral 102 is DVD-ROM (Read Only Memory) acting as a detachable information storage medium in which road map information for updating is stored, and numeral 103 is a DVD drive for reading information from the DVD-ROM 102, and numeral 104 is a hard disk drive (HDD) acting as information storing portion for storing the road map information, and numeral 105 is a display acting as output portion for displaying information, and numeral 106 is a GPS receiver acting as clocking portion for acquiring information about the present exact time and date based on information received from a GPS (Global Positioning System) satellite equipped with an atomic clock.

Generally, the control unit 101 executes a navigation operation using the road map information stored in the HDD 104, and can update the road map information inside the HDD 104 by copying the road map information for updating from the DVD-ROM 102 to the HDD 104.

Figure 2:
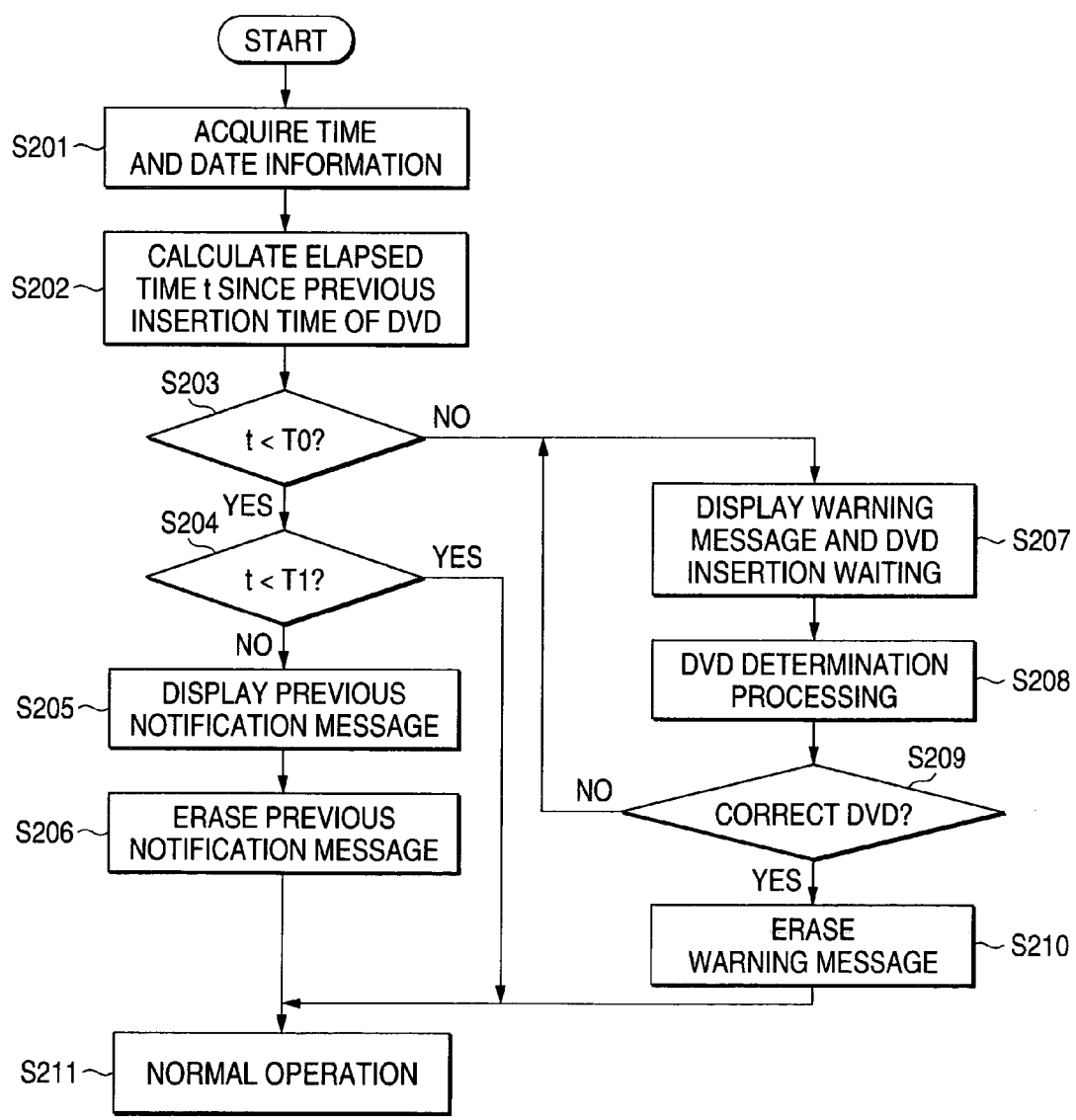
FIG. 2 is a flowchart showing a basic operation of the navigation apparatus in the first embodiment of the invention.
Figure 3:
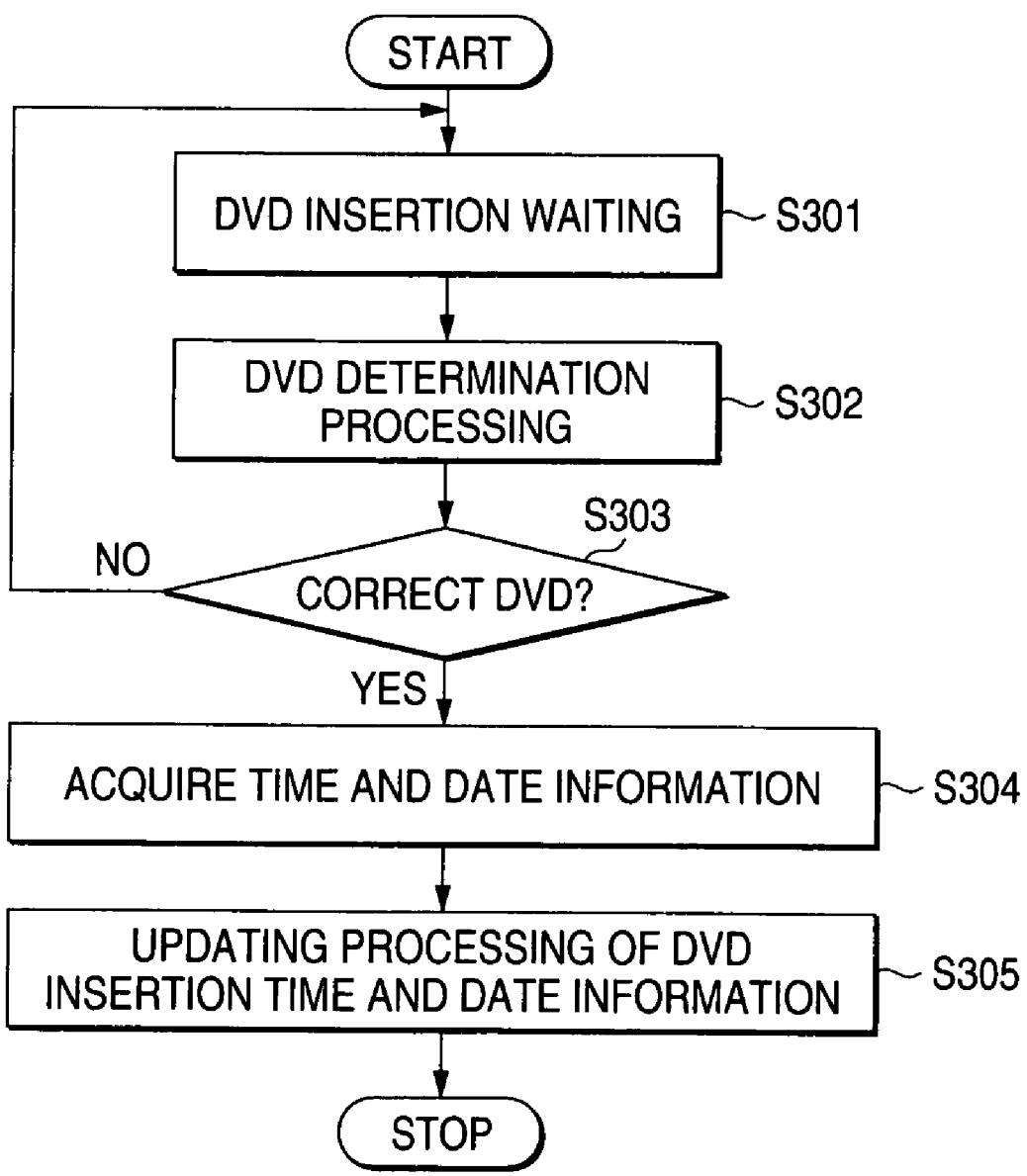
FIG. 3 is a flowchart showing a brief operation of DVD insertion time and date information updating processing of the navigation apparatus in the first embodiment of the invention.
Figure 4:
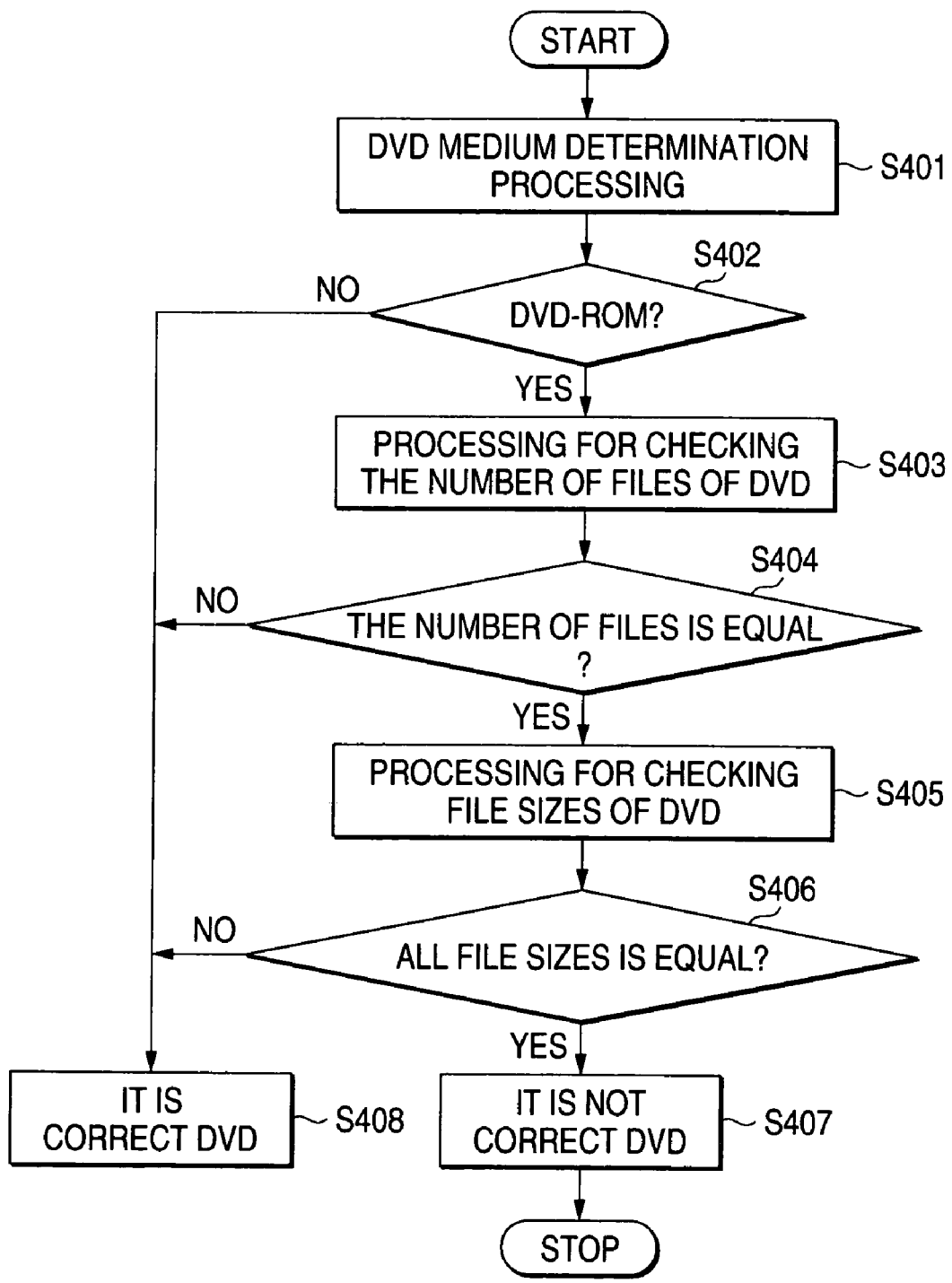
FIG. 4 is a flowchart showing a brief operation of DVD determination processing of the navigation apparatus in the first embodiment of the invention.

FIGS. 2 to 4 are flowcharts showing operations of the navigation apparatus in the first embodiment. The flowchart of FIG. 2 simultaneously operates completely independently of the flowchart of FIG. 3. The flowchart of FIG. 4 is a flowchart showing a common operation in a step of DVD determination processing in the respective flowcharts of FIGS. 2 and 3.

First, the flowchart of FIG. 2 will be described. FIG. 2 shows a flowchart showing a basic operation of the navigation apparatus in the first embodiment. By turning on a power source, the navigation apparatus starts an operation, and step S201 shown in FIG. 2 starts. This step S201 is a step of acquiring the present time and date information sequentially calculated by the GPS receiver 106. When the time and date information can be acquired, the flowchart proceeds to step S202.

In step S202, the previous insertion time and date of the DVD-ROM 102 recorded in a predetermined position of the HDD 104 are compared with the present time and date acquired in step S201 and elapsed time t since the previous insertion time of the DVD-ROM 102 is calculated. When the calculation is completed, the flowchart proceeds to step S203.

In step S203, the elapsed time t calculated in step S202 is compared with operation advisability determination time T0 which is a specified value and when t<T0 is satisfied, the flowchart proceeds to step S204 and when t<T0 is not satisfied, the flowchart proceeds to step S207.

In step S204, the elapsed time t is compared with user notification determination time T1. When t<T1 is satisfied, the flowchart proceeds to step S211 and the navigation apparatus performs the operation normally. When t<T1 is not satisfied, the flowchart proceeds to step S205.

In step S205, a previous notification message that "an operable period expires soon" is displayed on the display 105. Thereafter, in step S206, the previous notification message is erased after a lapse of a certain time since the message display or by a user manipulation, and the flowchart proceeds to step S211 and the navigation apparatus performs the operation normally.

Thus, the apparatus can be prevented from being disabled suddenly by notifying a user before a predetermined time of the time and date which is a time limit of use.

In step S207, a warning message that "an operable period is overdue" is displayed on the display 105, and a user is prompted to insert the DVD-ROM 102 in which road map information for updating is stored, and it waits until the DVD-ROM 102 is inserted.

When the DVD-ROM 102 is inserted, the flowchart proceeds to step S208 and it is determined whether or not the inserted DVD-ROM 102 is the same DVD-ROM 102 as that of the case of copying the road map information into the HDD 104. In step S208, processing of the determination is performed based on the flowchart of FIG. 4 described below.

When it is determined that it is the correct DVD-ROM 102 as a result of the determination in step S208, the flowchart proceeds from step S209 to step S210 and after the warning message is erased, the flowchart proceeds to step S211 and the navigation apparatus performs the operation normally. When it is not determined that it is the correct DVD-ROM 102 in step S208, the flowchart returns from step S209 to step S207 and display of the warning message is continued.

By steps S207, S208 and S209, the navigation apparatus does not operate normally until the correct DVD-ROM 102 is inserted when t<T0 is not satisfied and the operable period is overdue. That is, by the control unit 101, an operation for playing back various information recorded on the HDD 104 is stopped and does not function as the navigation apparatus.

In the case of a user who has bought the DVD-ROM 102 duly, the user can soon insert the DVD-ROM 102 to use the navigation apparatus, but a user with unauthorized use cannot use the navigation apparatus because the user does not have the DVD-ROM 102.

Thus, unauthorized use of the road map information can be inhibited without performing complicated user authentication processing by obliging a user to insert the authorized DVD-ROM 102 periodically.

Next, a flowchart of FIG. 3 will be described. FIG. 3 shows a flowchart showing a brief operation of insertion time and date information updating processing of the DVD-ROM 102 of the navigation apparatus in the first embodiment. By turning on a power source, the navigation apparatus starts an operation, and step S301 shown in FIG. 3 starts. In this step S301, the DVD drive 103 is monitored and it waits until the DVD-ROM 102 is inserted and when the DVD-ROM 102 is inserted, the flowchart proceeds to step S302.

In step S302, it is determined whether or not the contents of the DVD-ROM 102 are those of the same DVD-ROM 102 as that of the case of copying road map information into the HDD 104. In step S302, processing of the determination is performed based on the flowchart of FIG. 4 described below.

When it is determined that it is the correct DVD-ROM 102 as a result of the determination in step S302, the flowchart proceeds from step S303 to step S304. When it is not determined that it is the correct DVD-ROM 102, the flowchart returns from step S303 to step S301 and it waits until the DVD-ROM 102 is inserted again.

In step S304, time and date information sequentially calculated by the GPS receiver 106 is acquired. When the time and date information can be acquired, the flowchart proceeds to step S305.

In step S305, the previous insertion time and date of the DVD-ROM 102 recorded in a predetermined position of the HDD 104 are updated to the time and date acquired in step S304.

In the above manner, the insertion time and date of the DVD-ROM 102 can be updated.

Next, a flowchart of FIG. 4 will be described. FIG. 4 shows a flowchart showing a brief operation of determination processing of the DVD-ROM 102 of the navigation apparatus in the first embodiment. That is, processing of the case of determining whether or not the inserted DVD-ROM 102 is the same DVD-ROM 102 as that of the case of copying road map information into the HDD 104 is shown.

First, in step S401, a type of medium inserted is acquired and it is determined whether or not the medium is a non-record type DVD-ROM 102.

When the medium is the DVD-ROM 102 as a result of the determination in step S401, the flowchart proceeds from step S402 to step S403. When the medium is not the DVD-ROM 102, the flowchart proceeds from step S402 to step S408 and it is determined that the inserted medium is not the correct DVD-ROM 102.

In step S403, the number of files recorded on the inserted DVD-ROM 102 is acquired and is compared with information about the number of files retained in a predetermined position in the case of copying the road map information into the HDD 104.

When the number of files recorded on the DVD-ROM 102 is equal to the number of files retained in the HDD 104 as a result of the comparison in step S403, the flowchart proceeds from step S404 to step S405. When the number of files recorded is different from the number of files retained, the flowchart proceeds from step S404 to step S408 and it is determined that the inserted DVD-ROM 102 is not the correct DVD-ROM 102.

In step S405, file sizes of all the files recorded on the inserted DVD-ROM 102 are acquired and are compared with information about file sizes retained in a predetermined position in the case of copying the road map information into the HDD 104.

When the file sizes of all the files recorded on the DVD-ROM 102 is equal to the information about file sizes retained in the HDD 104 as a result of the comparison in step S405, the flowchart proceeds from step S406 to step S407 and it is determined that the inserted DVD-ROM 102 is the correct DVD-ROM 102.

When even one of the file sizes of all the files recorded on the DVD-ROM 102 is different from the information about file sizes retained in the HDD 104, the flowchart proceeds from step S406 to step S408 and it is determined that the inserted DVD-ROM 102 is not the correct DVD-ROM 102.

In the above manner, it can be determined whether or not the inserted DVD-ROM 102 is the correct DVD-ROM 102.

Figure 5:
FIG. 5 is a diagram showing a display screen example of a previous notification message of the navigation apparatus in the first embodiment of the invention.

FIG. 5 is a diagram showing a display screen example of a previous notification message of the navigation apparatus in the first embodiment, and shows a display screen example of the previous notification message displayed in step S205 of FIG. 2.

Figure 6:
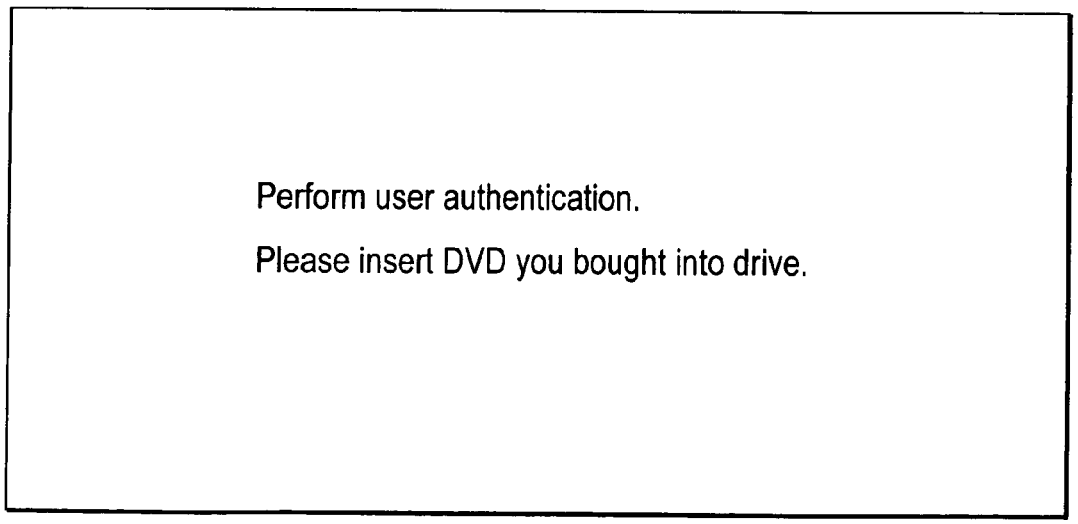
FIG. 6 is a diagram showing a display screen example of an operation expiration message of the navigation apparatus in the first embodiment of the invention.

FIG. 6 is a diagram showing a display screen example of an operation expiration message of the navigation apparatus in the first embodiment, and shows a display screen example of the warning message displayed in step S207 of FIG. 2.

Incidentally, the case of displaying a warning to a user by the previous notification message in steps S204, S205 and S206 of FIG. 2 has been shown in the above description, but either presence or absence of the previous warning will do.

Also, an example of the case of making a determination by a medium type, the number of files and a file size as a determination method of the DVD-ROM 102 in FIG. 4 has been shown, but a method for collating any or a plurality of the following information may be used as the determination method.
(1) Medium type
(2) Medium format
(3) Storage area size
(4) Unused storage area size
(5) The number of files
(6) File size
(7) File format
(8) Time and date of file creation
(9) File storage position
(10) Information in file.

Also, an example of the case of using the DVD-ROM 102 as the detachable information storage medium has been shown, but is not limited to this, and CD-ROM (Compact Disc-Read Only Memory) which is another disk type information storage medium, CD-R (Recordable), CD-RW (Rewritable), DVD±R, DVD±RW, DVD-RAM (Random Access Memory), an optical disk such as an MD (Mini Disk, registered trademark), a CF (Compact Flash) card, Smart Media (registered trademark), an SD memory card (registered trademark), a memory stick (registered trademark), an IC (Integrated Circuit) memory card, a magnetic memory card with a magnetic stripe such as an ID card, a memory card such as an optical memory card, a magnetic disk such as a flexible disk, a cartridge type magnetic tape such as a cassette tape and a variety of other information storage media may be used.

Also, an example of the case of using the HDD 104 as the information storing portion has been shown, but other information storing portion such as a nonvolatile memory device may be used.

Also, an example of the case of using the display 105 as the output portion has been shown, but other output portion such as sound output portion may be used.

Also, an example of the case of using the GPS receiver 106 as the clocking portion has been shown, but methods for using a wave clock or a time server on the Internet or other clocking methods may be used.

Also, an example of the case of using the road map information as the information has been shown, but a variety of other information may be used.

Also, an example of the case of being applied to the vehicle-mounted navigation apparatus mainly as the information provision apparatus has been shown, but may be applied to a portable information terminal device such as PDA (Personal Digital Assistant), PHS, a portable telephone carried by a user, or a navigation system mounted in other mobile units such as a bus, a train, a ship and an aircraft, or a variety of other mobile unit information systems. Further, it is not limited to devices mounted in the mobile units and may be applied to an information provision apparatus fixed and installed in an office or a home etc.

As described above, according to the first embodiment, it is configured so that in an information provision apparatus comprising a detachable information storage medium for storing information, information storing portion for storing the information read from the information storage medium, processing portion for controlling the information storing portion and playing back the information, and output portion for outputting the information played back, there is provided clocking portion for clocking elapsed time since the information storage medium was detached from the apparatus and the processing portion stops an operation for playing back the information recorded on the information storing portion when the elapsed time clocked by the clocking portion exceeds a specified value, so that unauthorized use of the information stored in the detachable information storage medium can be inhibited easily.

Also, according to the first embodiment, it is configured so that the processing portion outputs guidance of prompting attachment of the information storage medium to the apparatus before a predetermined time at which the elapsed time clocked reaches the specified value by the output portion, so that the apparatus can be prevented from being disabled suddenly.

Also, according to the first embodiment, it is configured so that when the information storage medium is attached to the apparatus, the processing portion collates predetermined information stored in the information storage medium with information for collation recorded on the information storing portion and continues an operation of the apparatus only when the collation result satisfies a predetermined condition, so that unauthorized use of the information stored in the detachable information storage medium can be inhibited surely.

Also, according to the first embodiment, it is configured so that the processing portion collates any or a plurality of the following information as predetermined information stored in the information storage medium, so that unauthorized use of the information stored in the detachable information storage medium can be inhibited more surely.

(1) Medium type
(2) Medium format
(3) Storage area size
(4) Unused storage area size
(5) The number of files
(6) File size
(7) File format
(8) Time and date of file creation
(9) File storage position
(10) Information in file.

Also, according to the first embodiment, it is configured so that the information storage medium is constructed of a CD or a DVD, so that unauthorized use of information stored in the CD or the DVD can be inhibited.

Also, according to the first embodiment, it is configured so that the information storing portion is constructed of a hard disk drive or a nonvolatile memory device, so that unauthorized use of information can be inhibited in an information provision apparatus having the hard disk drive or the nonvolatile memory device.

Also, according to the first embodiment, it is configured so that the clocking portion clocks elapsed time using any of a GPS, a wave clock and a time server on the Internet, so that the elapsed time can be clocked accurately and unauthorized use of information by unauthorized manipulation etc. of the elapsed time can be inhibited.

Also, according to the first embodiment, it is configured so that the information provision apparatus is a navigation apparatus and information includes map information, so that unauthorized use of the map information in the navigation apparatus can be inhibited.

What is claimed is:

1. An information provision apparatus comprising:
    a detachable information storage medium that stores information;
    an information storing portion that stores information read from the information storage medium;
    a processing portion that performs a reproduction processing of information stored in the information storing portion;
    an output portion that outputs information reproduced by the processing portion; and
    a clocking portion that counts an elapsed time since the information storage medium is detached from the information provision apparatus,
    wherein the processing portion stops the reproduction processing when the elapsed time exceeds a specified value.

2. The information provision apparatus according to claim 1,
    wherein the output portion outputs guidance of prompting attachment of the information storage medium to the information provision apparatus before a predetermined time at which the elapsed time reaches the specified value.

3. The information provision apparatus according to claim 1, further comprising:
    a comparison portion that compares predetermined information stored in the information storage medium with information for comparison stored in the information storing portion when the information storage medium is attached to the information provision apparatus,
    wherein the information provision apparatus continues an operation only when the comparison result satisfies a predetermined condition.

4. The information provision apparatus according to claim 3,
    wherein the predetermined information is at least one of medium type, medium format, storage area size, unused storage area size, the number of files, file size, file format, time and date of file creation, file storage position, and information in file.

5. The information provision apparatus according to claim 1,
    wherein the information storage medium is a CD or a DVD.

6. The information provision apparatus according to claim 1,
    wherein the information storing portion is a hard disk drive or a nonvolatile memory device.

7. The information provision apparatus according to claim 1,
    wherein the clocking portion counts the elapsed time using any of a GPS, a wave clock and a time server on the Internet.

8. The information provision apparatus according to claim 1,
    wherein the information provision apparatus is a navigation apparatus and the information includes map information.

9. The information provision apparatus according to claim 1,
    wherein the information storage medium is a read-only CD or a read-only DVD.

10. The information provision apparatus according to claim 3,
    wherein the predetermined information is at least one of medium format, storage area size, unused storage area size, the number of files, file size, file format, time and date of file creation, file storage position, and information in file.

11. The information provision apparatus according to claim 1, further comprising:
    a comparison portion that compares a number of files stored in the information storage medium with a number of files for comparison stored in the information storing portion when the information storage medium is attached to the information provision apparatus,
    wherein the information provision apparatus continues an operation only when the number of files stored in the information storage medium is the same as the number of files for comparison stored in the information storing portion.

12. The information provision apparatus according to claim 1, wherein the processing portion executes a navigation operation using road map information stored in the information storing portion, and updates the road map information inside the information storing portion by copying the road map information for updating from the detachable information storage medium to the information storing portion.

* * * * *